United States Patent
Lo

(10) Patent No.: US 6,920,132 B1
(45) Date of Patent: Jul. 19, 2005

(54) REDUCED PIN GIGABIT MEDIA INDEPENDENT INTERFACE

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 1150 days.

(21) Appl. No.: 09/583,316

(22) Filed: May 30, 2000

(51) Int. Cl.[7] ............... G06F 1/12; G06F 13/42; G06F 15/16; H04L 12/28
(52) U.S. Cl. ............. 370/386; 370/445; 370/502; 710/131; 713/401; 375/219
(58) Field of Search .............. 370/293, 463, 370/445, 465, 386, 389; 375/219, 341; 713/401; 710/62, 131

(56) References Cited

U.S. PATENT DOCUMENTS 6,108,726 A * 8/2000 Runaldue et al. ............ 710/62
6,385,208 B1 * 5/2002 Findlater et al. ............ 370/419

OTHER PUBLICATIONS

RMII Specification, Rev. 1.2 plus Addendum Rev. A, 1997.*
*RMII Consortium*, RMII™Specification, Rev. 1.2 (1997) pp. 1–14 and Addendum Rev. A .

35. Reconciliation Sublayer (RS) and Gigabit Media Independent Interface (GMII), (Local and Metropolican Area Networks), IEEE Std 802.3, 1998 Edition, pp 896–917.

22. Reconciliation Sublayer (RS) and Media Independent Interface (MII), (Local and Metropolican Area Networks), IEEE Std 802.3, 1998 Edition, pp 488–524.

Part 3: Carrier Sense Multiple Access with Collision Detection (CSMA/CD) Access Method and Physical Layer Specifications, IEEE Std 802.3, 1998 Edition, Sections 14, 24, 25, 28, 35, 36 and Supplement.

* cited by examiner

*Primary Examiner*—Afsar Qureshi

(57) ABSTRACT

A network interface which reduces pin count in an MII or GMII system by logically combining certain signals to eliminate redundancies, thereby enabling one external connection or pin to perform the functions previously performed by multiple pins. In particular, the two connections previously used for TX_EN and TX_ER are reduced to a single TX_CTRL connection. Similarly, the three connections for RX_DV, CRS and RX_ER are reduced to a single RX_CTRL connection. The COL connection is also eliminated.

148 Claims, 5 Drawing Sheets

REDUCED PIN GIGABIT MEDIA INDEPENDENT INTERFACE

INCORPORATION BY REFERENCE

IEEE standard 802.3, including all of its sections, is incorporated by reference herein in its entirety.

1. Field of the Invention

The present invention relates to a reduced pin (gigabit) media independent interface, and a method of forming such an interface. More particularly, the invention relates to signal encoding and decoding techniques for reducing interface pin count.

2. Background of the Invention

Interconnections between computers, peripheral devices, and Internet appliances (referred to as network clients) are ubiquitous. With networks firmly established in everyday life, there is now more demand in the form of increased data transfer rate and functionality being placed on the network switches and other hardware which facilitate network communication to support more complex applications such as multimedia. As a result, the integrated circuits (ICs) in these components are becoming more highly integrated and complex to meet this demand. One problem is that added complexity tends to increase external connections or pin count.

Conventional networks may utilize twisted pair cable such as Category 5 and operate at a data rate of either 10 megabits per second (Mb/s) which generally complies with IEEE Standard 802.3, section 14, commonly known as 10BASE-T, and 100 Mb/s which generally complies with IEEE Standard 802.3, sections 24 and 25, commonly known as 100BASE-TX. With the demand for increased data transfer rates, a newer networking standard has been proposed that utilizes twisted pair cable and operates at a nominal data transfer rate of 1 gigabit (1000 megabits) per second. The 1 gigabit per second (Gb/s) transfer rate complies with IEEE Standard 802.3, section 40, commonly known as 1000BASE-T.

These two standards have different requirements and interfaces. When the network is operated in accordance with 10BASE-T or 100BASE-TX, the interface for interconnecting controllers and transceivers is defined in accordance with the a Media Independent Interface (MII). In either a 10BASE-T or a 100BASE-TX system, MII requires 16 connection lines or pins connecting the IC embodying the physical layers (PHY) to the IC embodying the media access controller layers (MAC). When the network is operated at a higher transmission rate in accordance with 1000BASE-T, the interface is defined by the Gigabit MII (GMII). 24 connection lines or pins are required for 1000BASE-T.

The pin count problem in such systems becomes more apparent when we consider that a typical network switch has n ports, where n is the number of PHY and MAC layers respectively. Since the n MACs are typically fabricated as a single integrated circuit, the number of pins are 24×n. For example, if there are 24 ports then the n MACs requires 24×24 or 576 pins. A higher number of pins result in a larger die, a larger package, a more complicated integrated circuit and higher costs, particularly at the higher data transfer rates.

Various attempts have been made to solve the above-mentioned problem. Two ad hoc standards, namely Reduced Media Independent Interface (RMII) and Serial Media Independent Interface (SMII) reduce the number of pins by serialization techniques for 10BASE-T and 100BASE-TX. The RMII technique requires 7 pins per port and the frequency doubles from 25 MHz to 50 MHz. Thus, for a 24 port switch 7×24 or 168 pins are required. The SMII technique requires 2 pins per port plus 1 synchronizing pin, and the frequency increases five fold from 25 MHz to 125 MHz. In the SMII technique 2×24÷1 or 49 pins are required. As will be appreciated by those of ordinary skill in the art, these techniques operate at frequencies in which clock recovery between the PHY and MAC layers is not required.

While RMII and SMII provide reduced pin count interfaces, they are only applicable to 10BASE-T and 100BASE-TX systems. Thus, there is a need for an effective interface that reduces pin or connection count in a 1000BASE-T system without compromising functionality, and that also has the flexibility to be used in 10BASE-T and 100BASE-TX systems as well.

OBJECTS AND SUMMARY OF THE INVENTION

It is therefore an object of this invention to provide a network interface which reduces the number of pins or connections without compromising functionality.

It is a further object of this invention to provide a reduced pin media independent interface, such as a reduced pin gigabit media independent interface (reduced pin GMII).

According to one aspect of the invention, a method of encoding signals for a network device is provided. The method comprises the steps of transmitting a clock signal; forming a transmit control signal comprising in one half of a cycle of the clock signal a transmit enable signal and comprising in the other half of the cycle of the clock signal a transmit error signal; transmitting the transmit control signal; and transmitting a data signal.

The signal encoding is preferably as follows. When the transmit enable signal is asserted, the data signal comprises one of packet data and symbol error data. When neither the transmit enable signal nor the transmit error signal are asserted in a cycle of the clock signal, the data signal comprises idle data When the transmit enable signal is asserted and the transmit error signal is not asserted in a cycle of the clock signal, the data signal comprises packet data. When both the transmit enable signal and the transmit error signal are asserted in a cycle of the clock signal, the data signal comprises symbol error data. When the transmit enable signal is not asserted and the transmit error signal is asserted in a cycle of the clock signal, the data signal comprises one of carrier extension data and carrier extension data with error.

According to another aspect, the invention involves a method of decoding signals for a network device, comprising the steps of receiving a clock signal; receiving a receive control signal; decoding the receive control signal comprising in one half of a cycle of the clock signal a receive data valid signal or a carrier sense signal and in the other half of the cycle of the clock signal a receive error signal; and receiving a data signal.

The method preferably further comprising the step of decoding a preamble from the received data signal.

The signal decoding is preferably as follows. When the one half of the receive control signal is in a first state (i.e., not asserted) and the other half of the receive control signal is in the first state, the preamble is set to a first condition (e.g., not present). When the one half of the receive control signal is in a second state (i.e., asserted), the other half of the receive control signal is in the first state, and the preamble is in the first condition, a carrier sense signal is in the second state. When the one half of the receive control signal is in the second state, the other half of the receive control signal is in the first state, the preamble is in the first condition, and the received data signal comprises first predetermined data, then the preamble is set to the second condition and subsequent received data is decoded. When the one half of the receive control signal is in the second state, the other half of the receive control signal is in the first state, and the preamble is in a second condition (i.e., present), then the received data signal comprises packet data. When the one half of the receive control signal is in the second state, the other half of the receive control signal is in the second state, and the received data signal comprises second predetermined data, then a false carrier is asserted. When the one half of the receive control signal is in the second state, the other half of the receive control signal is in the second state, and the received data signal comprises first predetermined data, then a symbol error is asserted. When the one half of the receive control signal is in the first state, the other half of the receive control signal is in the second state, and the received data signal comprises one of third and fourth predetermined data, then the preamble is set to the first condition and a carrier extension is asserted.

According to a further aspect of the invention, a method of decoding signals for a network device is provided. The method comprises the steps of receiving a clock signal; receiving a transmit control signal; decoding the transmit control signal comprising in a half of a cycle of the clock signal a transmit enable signal and in the other half of the cycle of the clock signal a transmit error signal; and receiving a data signal.

The decoding scheme is preferably as follows. When the transmit enable is asserted, the data signal comprises one of packet data and symbol error data. When neither the transmit enable signal nor the transmit error signal are asserted in a cycle of the clock signal, the data signal comprises idle data. When the transmit enable signal is asserted and the transmit error signal is not asserted in a cycle of the clock signal, the data signal comprises packet data. When both the transmit enable signal and the transmit error signal are asserted in a cycle of the clock signal, the data signal comprises a symbol error data. When the transmit enable signal is not asserted and the transmit error signal is asserted in a cycle of the clock signal, the data signal comprises one of carrier extension data and carrier extension data with error.

According to still another aspect, the invention involves a method of encoding signals for a network device, comprising the steps of transmitting a clock signal; encoding a receive control signal comprising in one half of a cycle of the clock signal a receive data valid signal or a carrier sense signal and in the other half of the cycle of the clock signal a receive error signal; transmitting the receive control signal; and transmitting a data signal.

The method preferably further comprises the step of encoding a preamble for the data signal.

The encoding scheme is preferably as follows. When a carrier sense signal is in a second state (i.e., asserted), the one half of the receive control signal is set to the second state, and the other half of the receive control signal is set to a first state (i.e., not asserted). When a subsequent data signal containing packet data is to be transmitted, the one half of the receive control signal is set to the second state, the other half of the receive control signal is set to the first state, and a current data signal is set to first predetermined data. When the data signal comprises packet data, the one half of the receive control signal is set to the second state, and the other half of the receive control signal is set to the first state. When a false carrier is asserted, the one half of the receive control signal is set to the second state, the other half of the receive control signal is set to the second state, and the received data signal is set to second predetermined data. When a symbol error is asserted, the one half of the received control signal is set to the second state, the second half of the receive control signal is set to the second state, and the receive data signal is set to first predetermined data. When a carrier extension is asserted, the one half of the receive control signal is set to the first state, the other half of the receive control signal is set to the second state, and the received data signal is set to one of third and fourth predetermined data.

Other aspects of the invention include various networking devices for implementing the signal encoding and/or decoding schemes described above, and an interface signaling protocol by which the signal encoding/decoding schemes operate.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
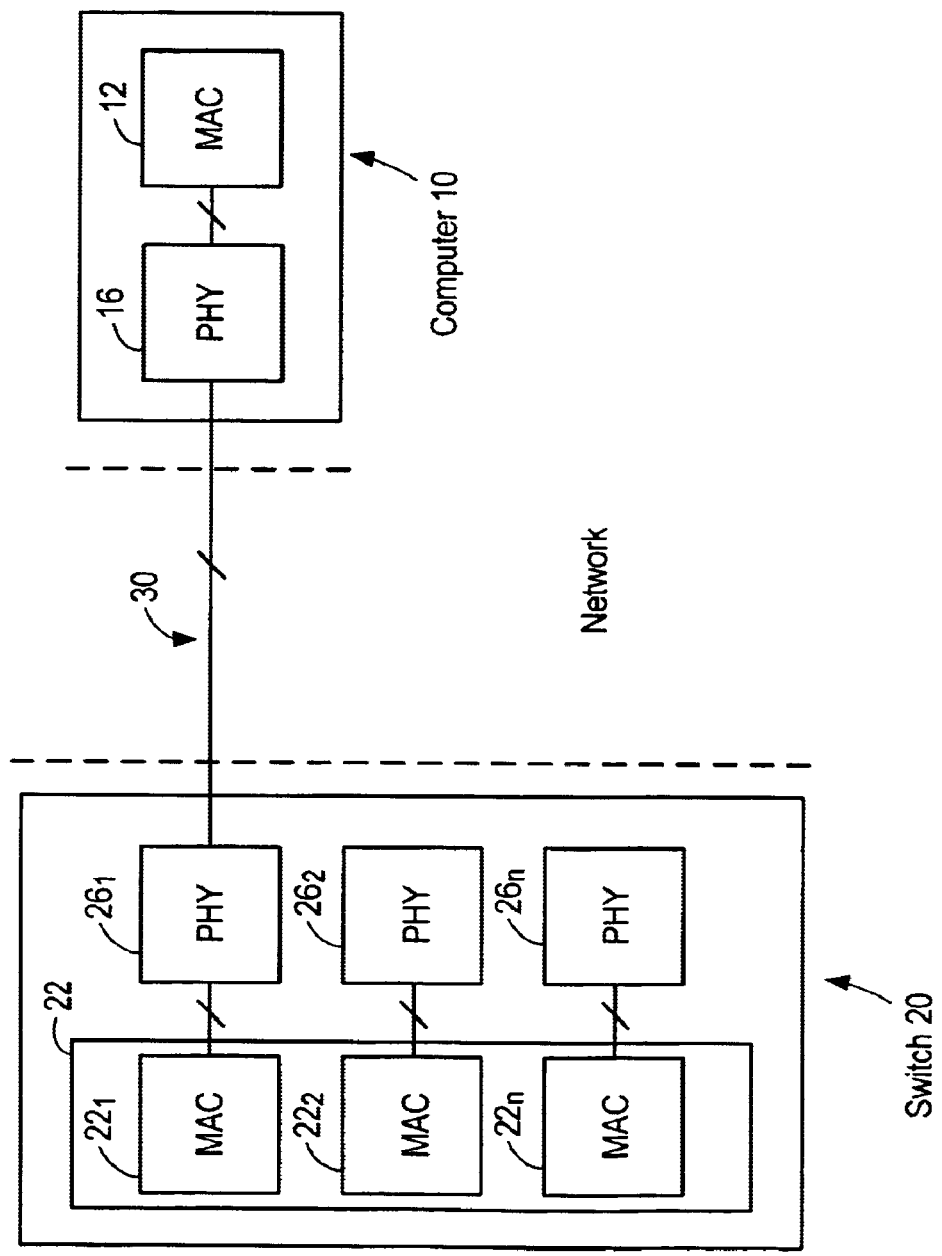
FIG. 1 is a schematic diagram of a networking system in which aspects of the present invention may be employed.

FIG. 1 is schematic diagram of a typical networking system in which embodiments of the present invention may be employed. A computer 10 is connected to a first port of switch 20 via a communications channel, such as, twisted pair cable 30. Switch 20 may comprise 24 ports, to allow computer 10 to communicate with other computers, peripherals, network appliances and other networks. As will be appreciated by one of ordinary skill in the art, communication channel 30 may be implemented using a variety of techniques, such as wired, wireless, radio frequency, optical or the like.

Computer 10 comprises a media access controller or MAC 12 and physical layer interface (PHY) or transceiver 16, which are connected to each other by an interface defined by, for example, the MII for 10BASE-T standard and for 100BASE-TX standard, or the GMII for 1000BASE-T standard. MII for 10BASE-T standard and for 100BASE-TX standard are discussed at IEEE standard 802.3, section 22. The Gigabit Media Independent Interface (GMII) is defined by IEEE 802.3 section 35. Both of these sections of IEEE 802.3 are incorporated by reference herein.

MAC 12 controls media access of transmitting and receiving packets to and from computer 10. Typically for gigabit level products, MAC 12 and PHY 16 are implemented as individual integrated circuits.

Switch 20 comprises MAC $22_n$, and PHY $26_n$, which are respectively connected to each other in accordance with an interface as defined above. MAC $22_n$ and PHY $26_n$ are functionally similar to MAC 12 and PHY 16 of computer 10.

If MII is used, data is passed to and from MAC $22_n$ in 4 bit wide nibbles. The nibbles are converted to and from 10BASE-T or 100BASE-TX on the network side. If GMII is used, data is passed to and from MAC $22_n$ in 8 bit wide bytes. The bytes are converted to and from 1000BASE-T on the network side Note that if fiber is used on the network side then the bytes are converted to and from 1000BASE-X on the network side. In other words, the MII/GMII provides a standard interface from a MAC to a transceiver regardless of the actual protocol used on the network side.

Figure 2:
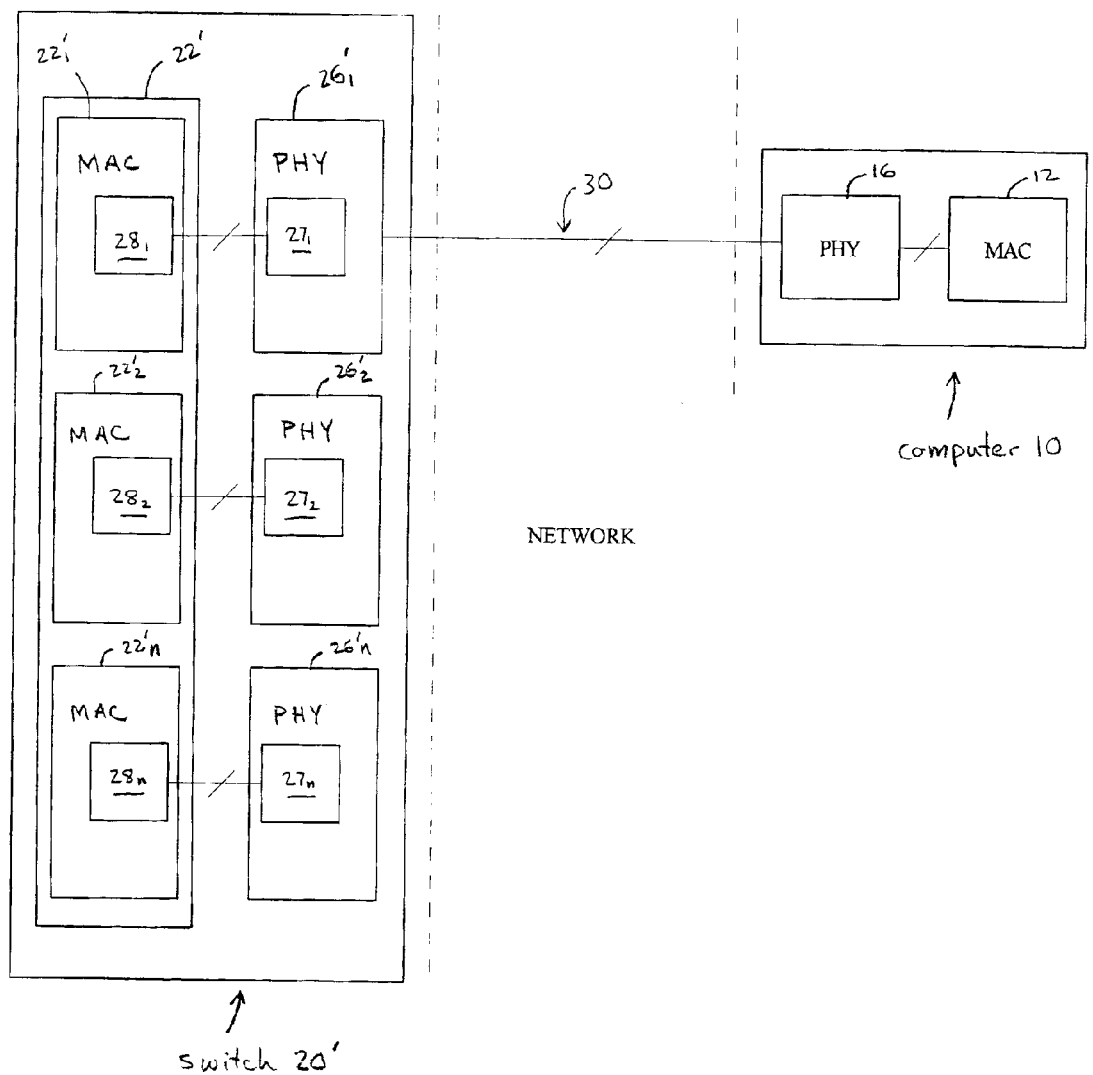
FIG. 2 is a schematic diagram of another networking system in which aspects of the present invention may be employed.

Referring now to FIG. 2, another networking environment in which the present invention may be practiced is illustrated. As shown in FIG. 2, computer 10 is connected to a first port of switch 20' via a communications channel, such as twisted pair cable 30. Switch 20' may comprise 24 ports to allow computer 10 to communicate with other computers, peripherals, network appliances and other networks.

Computer 10 comprises a media access controller or (MAC) 12 and physical layer interface (PHY) or transceiver 16, which are connected to each other in accordance with an interface, such as, MII or GMII discussed above. MAC 12, computer 10, and PHY 16 are similar to those described above in connection with FIG. 1.

Switch 20' comprises n ports. Each of the n ports comprises MAC $22'_n$ and PHY $26'_n$. PHY $26'_n$ comprises serializer interface $27_n$, and MAC $22'_n$ comprises serializer interface $28_n$, which are connected to each other to facilitate communication between MAC $22'_n$ and PHY $26'_n$. Serializer interfaces $28_1$–$28_n$ and MACs $22'_1$–$22'_n$ are fabricated on a single integrated circuit. PHY $26'_n$ and serializer interface $27_n$ are fabricated on another integrated circuit.

Figure 3:
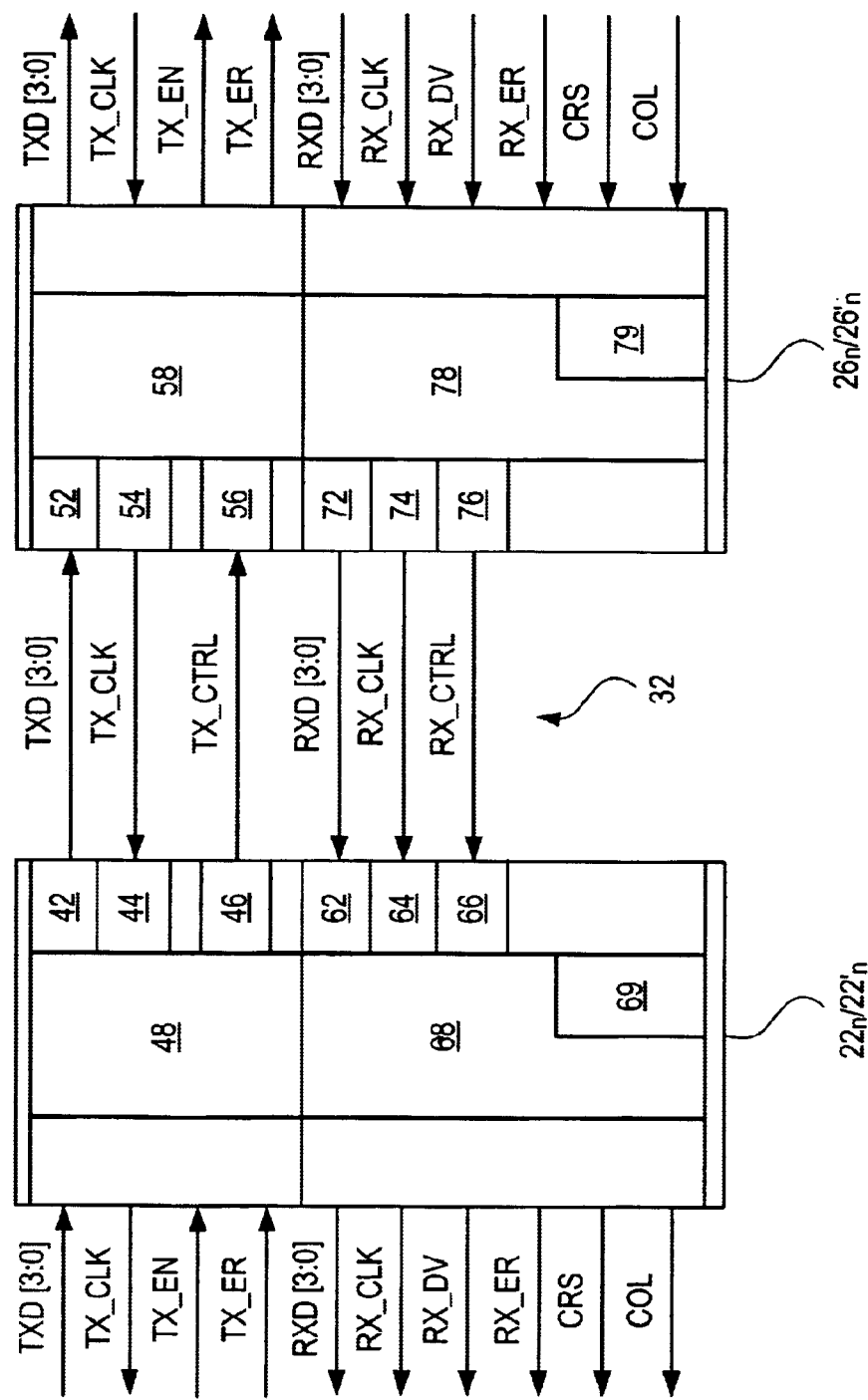
FIG. 3 is a detailed schematic diagram of an interface between a media access controller (MAC) and a physical layer (PHY) in accordance with an embodiment of the invention.

Referring now to FIG. 3, a schematic diagram of a reduced pin interface 32 constructed in accordance with an embodiment of the invention is illustrated. In this embodiment, interface 32 reduces the number of pins or connections in an MII interface between a MAC $22_n$/$22'_n$ and a PHY $26_n$/$26_n$' by encoding and decoding various MII signals, as described below.

Conventional MII design includes five groups of signals: transmit signals, receive signals, control signals, management signals and power. As shown in FIG. 3, the transmit signals include a nibble-wide Transmit Data (TXD [3:0]), plus associated Transmit Clock (TX_CLK), Transmit Enable (TX_EN), and Transmit Error (TX_ER) signals. The data is synchronous with the clock, which has a rate one-fourth that of the data rate (that is, 25 MHz for a 100 Mb/s Ethernet and 2.5 MHz for a 10 Mb/s Ethernet). Transmit signals are used to move data from the controller to the transceiver for encoding and transmission on the LAN.

As shown in FIG. 3, MII receive signals include a nibble-wide Receive Data (RXD [3:0]), plus associated Receive Clock (RX_CLK), Receive Data Valid (RX_DV), and Receive Error (RX_ER) signals. The data is synchronous with the clock, the rate of which is one-fourth that of the data rate. Receive signals are used to move decoded data from the transceiver to the controller.

Ethernet control signals include Carrier Sense (CRS) and Collision Detect (COL) signals generated by the transceiver and used by the controller for medium access control, as shown in FIG. 3. These signals are used only in half-duplex mode; they are ignored in full-duplex mode.

There are two management signals (not shown), which include a serial management I/O signal (MDIO) and an associated clock (MDC). Management information is exchanged (bidirectionally) between the controller and the transceiver for configuration and control.

A VDC power supply (not shown) is provided by the controller for operating the transceiver. A return path is provided for both the power and the logic signals.

Figure 5:
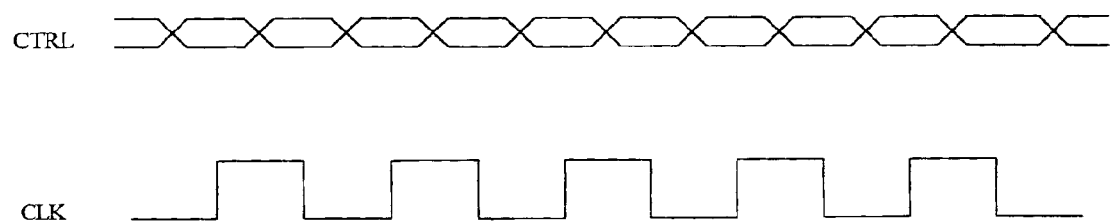
FIG. 5 is a timing diagram illustrating the relationship between a control signal and its corresponding clock signal in accordance with embodiments of the invention.

In accordance with this embodiment of the invention, interface 32 employs the following signals: TXD [3:0], TX_CLK, TX_CTRL, RXD [3:0], RX_CLK, and RX_CTRL to reduce the interface connections or pins between MAC $22_n$/$22'_n$ and PHY $26_n$/$26'_n$. TX_CTRL and RX_CTRL are control signals that are used to carry information previously carried on multiple signals. TX_CTRL and RX_CTRL run at either a rate of 5 Mb/s in which case TX_CLK and RX_CLK run at 2.5 MHz, or at rate of 50 Mb/s in which case TX_CLK and RX_CLK run at 25 MHz. The relationship between each of these CTRL signals and its corresponding CLK signal is illustrated by the timing diagram in FIG. 5.

On its interface transmit side, MAC $22_n$/$22'_n$ comprises a plurality of transmitting circuits including a data signal transmitter 42 that transmits TXD [3:0], a clock transmitter 44 that transmits TX_CLK, and a control signal transmitter 46 that transmits an encoded TX_CTRL signal. MAC $22_n$/$22'_n$ also includes an encoder 48 that forms the encoded TX_CTRL signal, as described below.

A corresponding set of receiver circuits are provided on the interface receive side of PHY $26_n$/$26'_n$. These circuits include a data signal receiver 52 that receives the TXD [3:0], a clock receiver 54 that receives TX_CLK, and a control signal receiver 56 that receives the encoded TX_CTRL signal. PHY $26_n$/$26'_n$ also includes a decoder that decodes TX_CTRL, as described below.

TX_CTRL alternates between transmitting TX_EN and TX_ER. In a preferred embodiment, the encoding is as follows. When TX_CTRL is 0 during a full TX_CLK cycle, any data or the data lines is idle data. When TX_CTRL is 1 during one (e.g., the first) half of a TX_CLK cycle, the type of data on the data lines depends on the value of TX_CTRL during the other (e.g., the second) half of that TX_CLK cycle and the bits on the data lines. A TX_CTRL value of 0 during the other half of the TX_CLK cycle for any data on the data lines indicates that such data is packet data. A TX_CTRL value of 1 during the other half of the TX_CLK cycle with the data lines carrying a 0101 sequence means that such data is symbol error data. The signal encoding/decoding is summarized in the table below.

| One (e.g., first) half of TX_CLK TX_CTRL | Other (e.g., second) half of TX_CLK TX_CTRL | TXD [3:0] | Definition |
|---|---|---|---|
| 0 | 0 | xxxx | Idle |
| 0 | 0 | xxxv | Inband signaling |
| | | | v |
| | | | 0 = 10BASE-T |
| | | | 1 = 100BASE-TX |
| 1 | 0 | xxxx | Packet Data |
| 1 | 1 | 0101 | Symbol Error |

Turning now to the receive signals, on its interface receive side, MAC $22_n/22'_n$ comprises a plurality of receiver circuits including a data signal receiver 62 that receives RXD [3:0], a clock receiver 64 that receives RX_CLK, and a control signal receiver 66 that receives an encoded RX_CTRL signal. MAC $22_n/22'_n$ also includes a decoder 68 that is in communication with a state machine controller 69 for decoding the encoded RX_CTRL signal, as described below.

Corresponding transmitter circuits are provided on the interface transmit side of PHY $26_n/26'_n$. Such circuits include a data signal transmitter 72 that transmits RXD [3:0], a clock transmitter 74 that transmits RX_CLK, and a control signal transmitter 76 that transmits the encoded RX_CTRL signal. PHY $26_n/26'_n$ also includes an encoder 78 that operates in connection with a state machine controller 79 to encode the RX_CTRL signal.

In the encoding/decoding scheme, the logical OR of RX_DV and CRS is carried by RX_CTRL in one (e.g., the first) half of a cycle of RX_CLK, and RX_ER is carried by RX_CTRL in the other (e.g., the second) half of that RX_CLK cycle. To distinguish between RX_DV and CRS, RXD [3:0] is decoded by the controller. Normally, CRS is asserted before RX_DV. Hence, during the time between assertion of CRS and assertion of RX_DV, RXD [3:0] should be 0000. Since a packet of data starts with a 0101 pattern, the assertion of RX_DV can be denoted by a transition of RXD [3:0] from 0000 to 0101. An error condition may occur which causes CRS to assert. This is known as a false carrier which can be denoted by a transition of RXD [3:0] from 0000 to 1010.

The signal encoding/decoding scheme for the receive signals is described by a state machine algorithm implemented by state machine controllers 69 and 79 as set forth in the table below. It should be noted that a preamble is an initial eight bit sequence of 10101010 of an uncoded data packet.

| One (e.g., first) half of RX_CLK RX_CTRL | Other (e.g., second) half of X_CLK RX_CTRL | RXD [3:0] | Preamble Present? | Definition |
|---|---|---|---|---|
| 0 | 0 | xxxx | x | Set "Preamble Present?" to No; Idle |

-continued

| One (e.g., first) half of RX_CLK RX_CTRL | Other (e.g., second) half of X_CLK RX_CTRL | RXD [3:0] | Preamble Present? | Definition |
|---|---|---|---|---|
| 0 | 0 | pqxs | x | Inband signaling |
| | | | | p |
| | | | | 0 = half-duplex |
| | | | | 1 = full-duplex |
| | | | | q |
| | | | | 0 = link down |
| | | | | 1 = link up |
| | | | | s |
| | | | | 0 = 10BASE-T |
| | | | | 1 = 100BASE-TX |
| 1 | 0 | 0000 | No | CRS asserted but no data yet |
| 1 | 0 | 0101 | No | Set "Preamble Present?" to Yes; Decode data |
| 1 | 0 | xxxx | Yes | Packet Data |
| 1 | 1 | 1010 | x | False Carrier |
| 1 | 1 | 0101 | x | Symbol Error |

The COL pin or connection is also eliminated, as this signal is represented by (TX_EN OR TX_ER) AND CRS.

Figure 4:
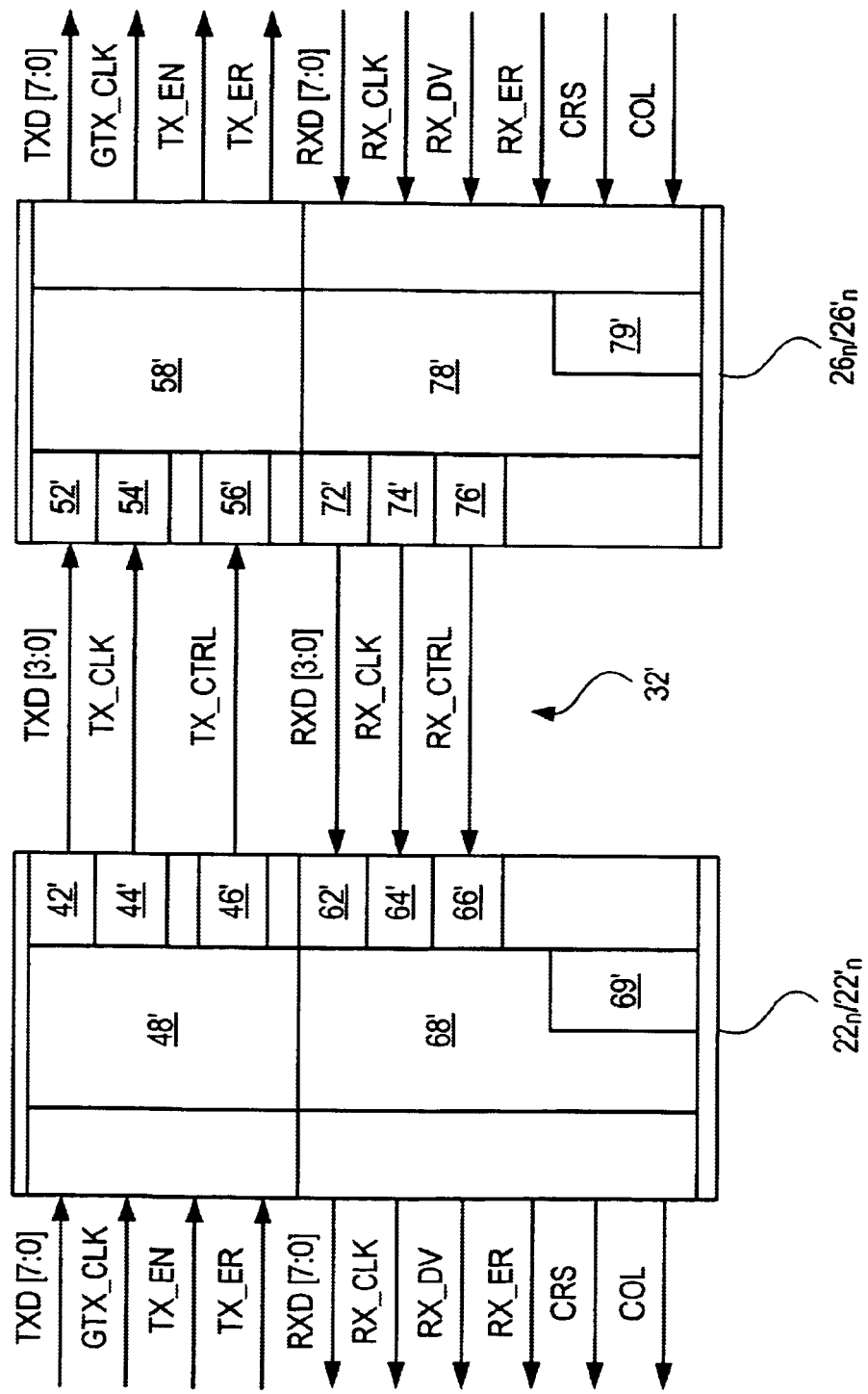
FIG. 4 is a detailed schematic diagram of an interface between a media access controller (MAC) and a physical layer (PHY) in accordance with another embodiment of the invention.

Referring now to FIG. 4, a schematic diagram of a reduced pin interface 32' constructed in accordance with another embodiment of the invention is illustrated. In this embodiment, interface 32' reduces the number of pins or connections in a GMII interface in a similar manner as described above. However, in this embodiment, the signal encoding and decoding techniques are applied to GMII signals.

Logically, GMII is identical to MII, and most of the signals used the same names. However, there are several differences. The GMII data path is byte-wide rather than nibble-wide. In conventional GMII signaling, this reduces the GMII clock from 250 MHz (if the data path were nibble-wide) to 125 MHz. In addition, the clock is sourced from the controller, rather than the transceiver as is the case with MII. This is done to eliminate timing errors due to propagation delays of the ICs and circuit tracers used implement the interface. A brief description of the conventional GMII signals is given below.

As shown in FIG. 4, TXD [7:0] is the byte-wide data transmission signal, which is synchronous with a Gigabit Transmit Clock (GTX_CLK) signal that runs at a nominal rate of 125 MHz for data transmission. A Transmit Enable (TX_EN) signal indicates when valid data is present on TXD lines, and a Transmit Error (TX_ER) signal is used to propagate errors through a repeater in shared, half-duplex LANs. Both TX_EN and TX_ER are synchronous with GTX_CLK.

As for the receive signals, there is RXD [7:0], the byte-wide data receive signal which is synchronous with a Receive Clock (RX_CLK) signal that is a recovered clock (125 MHz, nominal) from received data. A Receive Data Valid (RX_DV) signal indicates when valid data is present on the RXD lines, and a Receive Error (RX_ER) signal indicates that an error was detected while received data was being decoded. Both RX_DV and RX_ER are synchronous with RX_CLK. These signals are illustrated in FIG. 4.

As shown in FIG. 4, there are two Ethernet control signals, both of which are asynchronous. A Carrier Sense (CRS) signal indicates when the physical layer channel is active, either with a received or transmitted signal. A Collision Detect (COL) signal indicates when one or more other stations are concurrently transmitting on the channel.

Management signals (not shown) include a Management Data Input/Output (MDIO) signal that is used to transmit and receive management information between the controller and transciever. Also included is a Management Data Clock (MDC) used for management data exchange. There is also a VDC power supply (not shown).

The encoding/decoding scheme for the GMII signals, in accordance with this embodiment of the invention, is similar to that described above with respect to the MII signals in the previous embodiment, in that two control signals TX_CTRL and RX_CTRL are used to carry information previously carried on multiple signals. In this embodiment, TX_CTRL and RX_CTRL are each run at 250 Mb/s, with TX_CLK and RX_CLK being run at 125 MHz. The relationship between each of these CTRL signals and its corresponding CLK signal is illustrated by the timing diagram in FIG. 5. However, in this embodiment, TX_CTRL and RX_CTRL also encode for Carrier Extension and Carrier Extension with error data. In addition, the byte-wide data path is folded from 8 signals to 4 by running the data at twice the rate that it is normally run.

In this embodiment, MAC $22_n/22'_n$ and PHY $26_n/26'_n$ each include transmitter and receiver circuits for the interface signals, an encoder, a decoder, and a state machine controller. Each of these circuits is identified with the primed version of same reference numeral used to identify the corresponding component in the previous embodiment.

The folding of the incoming TXD [7:0] and RXD [7:0] signals to TXD [3:0] and RXD [3:0] signals respectively and unfolding of these nibble-wide data paths to the corresponding outgoing byte-wide data paths may be performed by appropriate circuitry embodied in MAC $22_n/22'_n$ and PHY $26_n/26'_n$.

In accordance with this embodiment of the invention, the encoding/decoding of the transmit signals is as follows. TX_CTRL alternates between transmitting TX_EN and TX_ER, as in the previous embodiment. In a preferred embodiment, the encoding is as follows. When TX_CTRL is 0 during a full TX_CLK cycle, any data on the data lines is idle data. When TX_CTRL is 1 during one (e.g., the first) half of a TX_CLK cycle, the type of data on the data lines depends on the value of TX_CTRL during the other (e.g., the second) half of that TX_CLK cycle and the bits on the data lines. A TX_CTRL value of 0 during the other half of the TX_CLK cycle for any data on the data lines indicates that such data is packet data. A TX_CTRL value of 1 during the other half of the TX_CLK cycle with the data lines carrying a 0101 sequence means that such data is symbol error data. Then TX_CTRL is 0 during one half of a TX_CLK cycle and 1 during the other half of that cycle, the meaning of the data on the data lines depends on the bits on the data lines. Data sequence 0111 indicates Carrier Extend data, while data sequence 1111 indicates Carrier Extend data with error. The encoding/decoding is summarized in the table below.

| One (e.g., first) half of TX_CLK TX_CTRL | Other (e.g., second) half of TX_CLK TX_CTRL | TXD [3:0] | Definition |
|---|---|---|---|
| 0 | 0 | xxxx | Idle |
| 0 | 0 | xxuv | Inband signaling uv |
|  |  |  | 00 = 10BASE-T |
|  |  |  | 01 = 100BASE-TX |
|  |  |  | 10 = 1000BASE-T |
|  |  |  | 11 = reserved |
| 1 | 0 | xxxx | Packet Data |
| 1 | 1 | 0101 | Symbol Error |
| 0 | 1 | 0111 | Carrier Extension |
| 0 | 1 | 1111 | Carrier Extension with Error |

The encoding/decoding of the receive signals is also similar to that described in connection with the previous embodiment, in that the logical OR of RX_DV and CRS is carried by RX_CTRL in one (e.g., the first) half of a cycle of RX_CLK, and RX_ER is carried by RX_CTRL in the other (e.g., the second) half of that RX_CLK cycle. To distinguish between RX_DV and CRS, RXD [3:0] is decoded by the controller. Normally, CRS is asserted before RX_DV. Hence, during the time between assertion of CRS and assertion of RX_DV, RXD [3:0] should be 0000. Since a packet of data starts with a 0101 pattern, the assertion of RX_DV can be denoted by a transition of RXD [3:0] from 0000 to 0101. An error condition may occur which causes CRS to assert. This is known as a false carrier which can be denoted by a transition of RXD [3:0] from 0000 to 1010.

Carrier extension can be denoted by forcing the first half of RX_CTRL, which is RX_DV or CRS, to a low state and the second half, which is RX_ER, to a high state, with RXD [3:0] encoded as 0111 or Carrier Extension with error as 1111.

The signal encoding/decoding scheme for the receive signals is described by a state machine algorithm implemented by state machine controllers 69' and 79' as set forth in the table below. It should be noted that a preamble is an initial eight bit sequence of 10101010 of an uncoded data packet.

| One (e.g., first) half of RX_CLK RX_CTRL | Other (e.g., second) half of X_CLK RX_CTRL | RXD [3:0] | Preamble Present? | Definition |
|---|---|---|---|---|
| 0 | 0 | xxxx | X | Set "Preamble Present?" to No; Idle |
| 0 | 0 | pqrs | x | Inband signaling p |
|  |  |  |  | 0 = half-duplex |
|  |  |  |  | 1 = full-duplex q |
|  |  |  |  | 0 = link down |
|  |  |  |  | 1 = link up |

-continued

| One (e.g., first) half of RX_CLK RX_CTRL | Other (e.g., second) half of X_CLK RX_CTRL | RXD [3:0] | Preamble Present? | Definition |
|---|---|---|---|---|
| | | | | rs<br>00 = 10BASE-T<br>01 = 100BASE-TX<br>10 = 1000BASE-T<br>11 = reserved |
| 1 | 0 | 0000 | No | CRS asserted but no data yet |
| 1 | 0 | 0101 | No | Set "Preamble Present?" to Yes; Decode subsequent data |
| 1 | 0 | xxxx | Yes | Packet Data |
| 1 | 1 | 1010 | X | False Carrier |
| 1 | 1 | 0101 | X | Symbol Error |
| 0 | 1 | 0111 | X | Set "Preamble Present?" to No; Carrier Extension |
| 0 | 1 | 1111 | X | Set "Preamble Present?" to No; Carrier Extension with error |

As in the previously described embodiment, the COL pin or connection is also eliminated, as this signal is represented by (TX_EN OR TX_ER) AND CRS.

Although interface 32 is shown in connection with MII signals and interface 32' with GMII signals, either interface may be used for 10BASE-T, 100BASE-TX or 1000BASE-T, in either half- or full-duplex mode. To this end, both of the interfaces 32 and 32' employ inband signaling to avoid contention on TX_CLK, since PHY $26_n/26'_n$ sources TX_CLK in 10BASE-T and 100BASE-TX operation and MAC $22_n/22'_n$ sources it in 1000BASE-T operation. Such inband signaling allows the PHY to inform the MAC at what speed and on what duplex the link is operating. It also allows the MAC to inform the PHY that it is ready for operation at a certain speed and duplex. To prevent contention as to TX_CLK sourcing in 10/100 operation, the PHY will not source the TX_CLK until the uv bits from the MAC matches the rs bits sourced from the PHY. The inband signaling occurs when TX_CTRL is 0 for a full clock cycle and/or when RX_CTRL is 0 for a full clock cycle, as illustrated in the tables above.

An alternate embodiment for avoiding contention on TX_CLK allows TX_CLK to be unidirectional. In this alternate embodiment, MAC $22_n/22'_n$ sources TX_CLK at 2.5, 25 or 125 MHz. Hence, there is no possibility that of contention on TX_CLK.

Thus, for this alternate TX_CLK reconciliation technique, TX_CLK in interface 32 would point in the opposite direction in FIG. 3 (i.e., to the right). In FIG. 4, TX_CLK is already sourced by the MAC; thus, there would be no change in the TX_CLK signal direction in this figure. A transmit FIFO circuit in PHY $26_n/26'_n$ is used to reconcile data with the TX_CLK signal.

It should be noted that the invention is not limited to the specific encoding schemes identified above. Rather, other encodings can be used. For example, TX_CTRL can be coded such that the 1/0 and 0/1 conditions are swapped. Similarly, RX_CTRL can be coded such that either the first or second 1/0 condition can be switched with either of the 1/1 conditions. This can be done because a "no error" case occurs more often than an "error" case. A 1/0 causes toggling on every cycle whereas a 1/1 does not. Coding of TX_CTRL and RX_CTRL in this manner also reduces power.

It should be readily apparent from the foregoing description that the present invention provides a network interface which reduces pin count by logically combining certain signals to eliminate redundancies, thereby enabling one pin to perform the functions previously performed by multiple pins. In particular, the present invention reduces the two connections previously used for TX_EN and TX_ER to a single TX_CTRL connection. Similarly, the invention reduces the three connections for RX_DV, CRS and RX_ER to a single RX_CTRL connection. The COL connection is also eliminated.

While the invention has been described in conjunction with specific embodiments, many further alternatives, modifications, variations and applications will be apparent to those skilled in the art in light of the foregoing description. For example, although the present invention has particular utility in connection with an Ethernet infrastructure operating in accordance with Ethernet standards and protocols, the invention is not so limited. The invention may also be employed with other network standards and protocols. Moreover, the present invention is not limited to the nominal 1 Gb/s data transmission rate and protocols. Thus, the invention described herein is intended to embrace all such alternatives, modifications, variations and applications as may fall within the spirit and scope of the appended claims.

What is claimed is:

1. A method of encoding signals for a network device, comprising the steps of:
    transmitting a clock signal;
    forming a transmit control signal comprising in one half of a cycle of the clock signal a transmit enable signal and comprising in the other half of the cycle of the clock signal a transmit error signal;
    transmitting the transmit control signal; and
    transmitting a data signal.

2. The method of claim 1, wherein when the transmit enable signal is asserted, the data signal comprises one of packet data and symbol error data.

3. The method of claim 2, wherein
    when neither the transmit enable signal nor the transmit error signal are asserted in a cycle of the clock signal, the data signal comprises idle data;
    when the transmit enable signal is asserted and the transmit error signal is not asserted in a cycle of the clock signal, the data signal comprises packet data; and
    when both the transmit enable signal and the transmit error signal are asserted in a cycle of the clock signal, the data signal comprises symbol error data.

4. The method of claim 3, wherein
    when the transmit enable signal is not asserted and the transmit error signal is asserted in a cycle of the clock signal, the data signal comprises one of carrier extension data and carrier extension data with error.

5. The method of claim 1, wherein the clock signal has a frequency of either 2.5 MHz, 25 or 125 MHz.

6. The method of claim 1, further comprising the step of inband signaling when neither the transmit enable signal nor the transmit error signal are asserted in a cycle of the clock signal.

7. A method of decoding signals for a network device, comprising the steps of:

receiving a clock signal;
receiving a receive control signal;
decoding the receive control signal comprising in one half of a cycle of the clock signal a receive data valid signal or a carrier sense signal and in the other half of the cycle of the clock signal a receive error signal; and
receiving a data signal.

8. The method of claim 7, further comprising the step of decoding a preamble from the received data signal.

9. The method of claim 8, wherein
when the one half of the receive control signal is in a first state and the other half of the receive control signal is in the first state, the preamble is set to a first condition.

10. The method of claim 9, wherein
when the one half of the receive control signal is in a second state, the other half of the receive control signal is in the first state, and the preamble is in a first condition, a carrier sense signal is in the second state.

11. The method of claim 9, wherein
when the one half of the receive control signal is in a second state, the other half of the receive control signal is in the first state, the preamble is in the first condition, and the received data signal comprises first predetermined data, then the preamble is set to a second condition and subsequent received data is decoded.

12. The method of claim 9, wherein
when the one half of the receive control signal is in a second state, the other half of the receive control signal is in the first state, and the preamble is in a second condition, then the received data signal comprises packet data.

13. The method of claim 9, wherein
when the one half of the receive control signal is in a second state, the other half of the receive control signal is in the second state, and the received data signal comprises second predetermined data, then a false carrier is asserted.

14. The method of claim 9, wherein
when the one half of the receive control signal is in a second state, the other half of the receive control signal is in the second state, and the received data signal comprises first predetermined data, then a symbol error is asserted.

15. The method of claim 9, wherein
when the one half of the receive control signal is in the first state, the other half of the receive control signal is in a second state, and the received data signal comprises one of third and fourth predetermined data, then the preamble is set to the first condition and a carrier extension is asserted.

16. The method of claim 7, further comprising the step of inband signaling when the one half of the receive control signal is in a first state and the other half of the receive control signal is in the first state.

17. A method of decoding signals for a network device, comprising the steps of:
receiving a clock signal;
receiving a transmit control signal;
decoding the transmit control signal comprising in a half of a cycle of the clock signal a transmit enable signal and in the other half of the cycle of the clock signal a transmit error signal; and
receiving a data signal.

18. The method of claim 17, wherein when the transmit enable is asserted, the data signal comprises one of packet data and symbol error data.

19. The method of claim 18, wherein
when neither the transmit enable signal nor the transmit error signal are asserted in a cycle of the clock signal, the data signal comprises idle data;
when the transmit enable signal is asserted and the transmit error signal is not asserted in a cycle of the clock signal, the data signal comprises packet data; and
when both the transmit enable signal and the transmit error signal are asserted in a cycle of the clock signal, the data signal comprises a symbol error data.

20. The method of claim 19, wherein
when the transmit enable signal is not asserted and the transmit error signal is asserted in a cycle of the clock signal, the data signal comprises one of carrier extension data and carrier extension data with error.

21. The method of claim 17, wherein the clock signal has a frequency of either 2.5, 25 or 125 MHz.

22. The method of claim 17, further comprising the step of inband signaling when neither the transmit enable signal nor the transmit error signal are asserted in a cycle of the clock signal.

23. A method of encoding signals for a network device, comprising the steps of:
transmitting a clock signal;
encoding a receive control signal comprising in one half of a cycle of the clock signal a receive data valid signal or a carrier sense signal and in the other half of the cycle of the clock signal a receive error signal;
transmitting the receive control signal; and
transmitting a data signal.

24. The method of claim 23, further comprising the step of encoding a preamble for the data signal.

25. The method of claim 24, wherein
when a carrier sense signal is in a second state, the one half of the receive control signal is set to the second state, and the other half of the receive control signal is set to a first state.

26. The method of claim 24, wherein
when a subsequent data signal containing packet data is to be transmitted, the one half of the receive control signal is set to a second state, the other half of the receive control signal is set to a first state, and a current data signal is set to first predetermined data.

27. The method of claim 24, wherein
when the data signal comprises packet data, the one half of the receive control signal is set to a second state, and the other half of the receive control signal is set to a first state.

28. The method of claim 24, wherein
when a false carrier is asserted, the one half of the receive control signal is set to the second state, the other half of the receive control signal is set to a second state, and the received data signal is set to second predetermined data.

29. The method of claim 24, wherein
when a symbol error is asserted, the one half of the received control signal is set to a second state, the second half of the receive control signal is set to the second state, and the receive data signal is set to first predetermined data.

30. The method of claim 24, wherein
when a carrier extension is asserted, the one half of the receive control signal is set to a first state, the other half of the receive control signal is set to a second state, and the received data signal is set to one of third and fourth predetermined data.

31. The method of claim 23, further comprising the step of inband signaling when the one half of the receive control signal is in a first state and the other half of the receive control signal is in the first state.

32. A network device, comprising:
a clock transmitter to transmit a clock signal;
an encoder to form a transmit control signal comprising in one half of a cycle of the clock signal a transmit enable signal and comprising in the other half of the cycle of the clock signal a transmit error signal;
a control signal transmitter to transmit the transmit control signal encoded by the encoder; and
a data signal transmitter to transmit a data signal.

33. The network device of claim 32, wherein when the encoder forms the transmit control signal on which the transmit enable signal is asserted, the data signal transmitter transmits the data signal comprised of one of packet data and symbol error data.

34. The network device of claim 33, wherein
when the encoder forms the transmit control signal on which neither the transmit enable signal nor the transmit error signal are asserted in a cycle of the clock signal, the data signal transmitter transmits the data signal comprised of idle data;
when the encoder forms the transmit control signal on which the transmit enable signal is asserted and the transmit error signal is not asserted in a cycle of the clock signal, the data signal transmitter transmits the data signal comprised of packet data; and
when the encoder forms the transmit control signal on which both the transmit enable signal and the transmit error signal are asserted in a cycle of the clock signal, the data signal transmitter transmits the data signal comprised of symbol error data.

35. The network device of claim 34, wherein
when the encoder forms the transmit control signal on which the transmit enable signal is not asserted and the transmit error signal is asserted in a cycle of the clock signal, the data signal transmitter transmits the data signal comprised of one of carrier extension data and carrier extension data with error.

36. The network device of claim 32, wherein the clock signal has a frequency of either 2.5, 25 or 125 MHz.

37. The network device of claim 32, wherein when the encoder forms the transmit control signal on which neither the transmit enable signal nor the transmit error signal are asserted in a cycle of the clock signal, then the encoder performs inband signaling.

38. A network device, comprising:
a clock receiver to receive a clock signal;
a control signal receiver to receive a receive control signal;
a decoder to decode the receive control signal comprising on one half of a cycle of the clock signal a receive data valid signal or a carrier sense signal and on the other half of the cycle of the clock signal a receive error signal; and
a data signal receiver to receive a data signal.

39. The network device of claim 38, wherein the decoder decodes a preamble from the received data signal.

40. The network device of claim 39, further comprising a state machine controller that
sets the preamble to a first condition, when the one half of the receive control signal is in a first state and the other half of the receive control signal is in the first state.

41. The network device of claim 40, wherein
when the one half of the receive control signal is in a second state, the other half of the receive control signal is in the first state, and the preamble is in a first condition, a carrier sense signal is in the second state.

42. The network device of claim 40, wherein the state machine controller sets the preamble to a second condition and the decoder decodes subsequent received data
when the one half of the receive control signal is in a second state, the other half of the receive control signal is in the first state, the preamble is in the first condition, and the received data signal comprises first predetermined data.

43. The network device of claim 40, wherein
when the one half of the receive control signal is in a second state, the other half of the receive control signal is in the first state, and the preamble is in a second condition, then the received data signal comprises packet data.

44. The network device of claim 40, wherein
when the one half of the receive control signal is in a second state, the other half of the receive control signal is in the second state, and the received data signal comprises second predetermined data, then a false carrier is asserted.

45. The network device of claim 40, wherein
when the one half of the receive control signal is in a second state, the other half of the receive control signal is in the second state, and the received data signal comprises first predetermined data, then a symbol error is asserted.

46. The network device of claim 40, wherein the state machine controller sets the preamble to the first condition and a carrier extension is asserted
when the one half of the receive control signal is in the first state, the other half of the receive control signal is in a second state, and the received data signal comprises one of third and fourth predetermined data.

47. A network device, comprising:
a clock receiver to receive a clock signal;
a control signal receiver to receive a transmit control signal;
a decoder to decode the transmit control signal comprising in a half of a cycle of the clock signal a transmit enable signal and in the other half of the cycle of the clock signal a transmit error signal; and
a data signal receiver to receive a data signal.

48. The network device of claim 47, wherein
when the decoder the decodes the transmit control signal on which the transmit enable signal is asserted, the data signal receiver receives the data signal comprised of one of packet data and symbol error data.

49. The network device of claim 48, wherein
when the decoder decodes the transmit control signal on which neither the transmit enable signal nor the transmit error signal are asserted in a cycle of the clock signal, the data signal receiver receives the data signal comprised of idle data;
when decoder decodes the transmit control signal on which the transmit enable signal is asserted and the transmit error signal is not asserted in a cycle of the clock signal, the data signal receiver receives the data signal comprised of packet data; and
when the decoder decodes the transmit control signal on which both the transmit enable signal and the transmit error signal are asserted in a cycle of the clock signal, the data signal receiver receives the data signal comprised of a symbol error data.

50. The network device of claim 49, wherein
when the decoder decodes the transmit control signal on which the transmit enable signal is not asserted and the transmit error signal is asserted in a cycle of the clock signal, the data signal receiver receives the data signal comprised of one of carrier extension data and carrier extension data with error.

51. The network device of claim 47, wherein the clock signal has a frequency of either 2.5, 25 or 125 MHz.

52. The network device of claim 47, wherein when the decoder decodes the transmit control signal on which neither the transmit enable signal nor the transmit error signal are asserted in a cycle of the clock signal, then the decoder performs inband signaling.

53. The network device of claim 47, wherein when the decoder decodes the transmit control signal on which neither the transmit enable signal nor the transmit error signal are asserted in a cycle of the clock signal, then the decoder performs inband signaling.

54. A network device, comprising:
a clock transmitter to transmit a clock signal;
an encoder to encode a receive control signal comprising on one half of a cycle of the clock signal a receive data valid signal or a carrier sense signal and on the other half of the cycle of the clock signal a receive error signal;
a control signal transmitter to transmit the receive control signal; and
a data signal transmitter to transmit a data signal.

55. The network device of claim 54, wherein the encoder encodes a preamble for the data signal.

56. The network device of claim 55, further comprising a state machine controller that
sets the one half of the receive control signal to a second state, and sets the other half of the receive control signal to a first state, when a carrier sense signal is in the second state.

57. The network device of claim 55, further comprising a state machine controller that
sets the one half of the receive control signal to a second state, sets the other half of the receive control signal to a first state, and sets a current data signal to first predetermined data, when a subsequent data signal containing packet data is to be transmitted.

58. The network device of claim 55, further comprising a state machine controller that
sets the one half of the receive control signal to a second state, and sets the other half of the receive control signal to a first state, when the data signal comprises packet data.

59. The network device of claim 55, further comprising a state machine controller that
sets the one half of the receive control signal to a second state, sets the other half of the receive control signal to the second state, and sets the received data signal to second predetermined data, when a false carrier is asserted.

60. The network device of claim 55, further comprising a state machine controller that
sets the one half of the received control signal to a second state, sets the second half of the receive control signal to the second state, and sets the receive data signal to first predetermined data, when a symbol error is asserted.

61. The network device of claim 55, further comprising a state machine controller that
sets the one half of the receive control signal to a first state, sets the other half of the receive control signal to a second state, and sets the received data signal to one of third and fourth predetermined data, when a carrier extension is asserted.

62. The network device of claim 54, wherein when the encoder encodes the receive control signal which is not asserted on neither one half of the cycle of the clock signal nor on the other half of the cycle of the clock signal, then the encoder performs inband signaling.

63. A network device, comprising:
means for transmitting a clock signal;
means for forming a transmit control signal comprising in one half of a cycle of the clock signal a transmit enable signal and comprising in the other half of the cycle of the clock signal a transmit error signal;
means for transmitting the transmit control signal; and
means for transmitting a data signal.

64. The network device of claim 63, wherein when the transmit enable signal is asserted, the data signal comprises one of packet data and symbol error data.

65. The network device of claim 64, wherein
when neither the transmit enable signal nor the transmit error signal are asserted in a cycle of the clock signal, the data signal comprises idle data;
when the transmit enable signal is asserted and the transmit error signal is not asserted in a cycle of the clock signal, the data signal comprises packet data; and
when both the transmit enable signal and the transmit error signal are asserted in a cycle of the clock signal, the data signal comprises symbol error data.

66. The network device of claim 65, wherein
when the transmit enable signal is not asserted and the transmit error signal is asserted in a cycle of the clock signal, the data signal comprises one of carrier extension data and carrier extension data with error.

67. The network device of claim 63, wherein the clock signal has a frequency of either 2.5, 25 or 125 MHz.

68. The network device of claim 63, wherein when the means for forming forms the transmit control signal on which neither the transmit enable signal nor the transmit error signal are asserted in a cycle of the clock signal, then the means for forming forms inband signaling.

69. A network device, comprising:
means for receiving a clock signal;
means for receiving a receive control signal;
means for decoding the receive control signal comprising in one half of a cycle of the clock signal a receive data valid signal or a carrier sense signal and in the other half of the cycle of the clock signal a receive error signal; and
means for receiving a data signal.

70. The network device of claim 69, further comprising means for decoding a preamble from the received data signal.

71. The network device of claim 70, wherein
when the one half of the receive control signal is in a first state and the other half of the receive control signal is in the first state, the preamble is set to a first condition.

72. The network device of claim 71, wherein
when the one half of the receive control signal is in a second state, the other half of the receive control signal is in the first state, and the preamble is in a first condition, a carrier sense signal is in the second state.

73. The network device of claim 71, wherein
when the one half of the receive control signal is in a second state, the other half of the receive control signal is in the first state, the preamble is in the first condition, and the received data signal comprises first predetermined data, then the preamble is set to a second condition and subsequent received data is decoded.

74. The network device of claim 71, wherein
when the one half of the receive control signal is in a second state, the other half of the receive control signal is in the first state, and the preamble is in a second condition, then the received data signal comprises packet data.

75. The network device of claim 71, wherein
when the one half of the receive control signal is in a second state, the other half of the receive control signal is in the second state, and the received data signal comprises second predetermined data, then a false carrier is asserted.

76. The network device of claim 71, wherein
when the one half of the receive control signal is in a second state, the other half of the receive control signal is in the second state, and the received data signal comprises first predetermined data, then a symbol error is asserted.

77. The network device of claim 71, wherein
when the one half of the receive control signal is in the first state, the other half of the receive control signal is in a second state, and the received data signal comprises one of third and fourth predetermined data, then the preamble is set to the first condition and a carrier extension is asserted.

78. A network device, comprising:
means for receiving a clock signal;
means for receiving a transmit control signal;
means for decoding the transmit control signal comprising in a half of a cycle of the clock signal a transmit enable signal and in the other half of the cycle of the clock signal a transmit error signal; and
means for receiving a data signal.

79. The network device of claim 78, wherein when the transmit enable is asserted, the data signal comprises one of packet data and symbol error data.

80. The network device of claim 79, wherein
when neither the transmit enable signal nor the transmit error signal are asserted in a cycle of the clock signal, the data signal comprises idle data;
when the transmit enable signal is asserted and the transmit error signal is not asserted in a cycle of the clock signal, the data signal comprises packet data; and
when both the transmit enable signal and the transmit error signal are asserted in a cycle of the clock signal, the data signal comprises a symbol error data.

81. The network device of claim 80, wherein
when the transmit enable signal is not asserted and the transmit error signal is asserted in a cycle of the clock signal, the data signal comprises one of carrier extension data and carrier extension data with error.

82. The network device of claim 78, wherein the clock signal has a frequency of either 2.5, 25 or 125 MHz.

83. The network device of claim 78, wherein when the means for decoding decodes the transmit control signal on which neither the transmit enable signal nor the transmit error signal are asserted in a cycle of the clock signal, then the means for decoding performs inband signaling.

84. The network device of claim 78, wherein when the means for decoding decodes the transmit control signal on which neither the transmit enable signal nor the transmit error signal are asserted in a cycle of the clock signal, then the means for decoding performs inband signaling.

85. A network device, comprising:
means for transmitting a clock signal;
means for encoding a receive control signal comprising on one half of a cycle of the clock signal a receive data valid signal or a carrier sense signal and on the other half of the cycle of the clock signal a receive error signal;
means for transmitting the receive control signal; and
means for transmitting a data signal.

86. The network device of claim 85, further comprising means for encoding a preamble for the data signal.

87. The network device of claim 86, wherein
when a carrier sense signal is in a second state, the one half of the receive control signal is set to the second state, and the other half of the receive control signal is set to a first state.

88. The network device of claim 86, wherein
when a subsequent data signal containing packet data is to be transmitted, the one half of the receive control signal is set to a second state, the other half of the receive control signal is set to a first state, and a current data signal is set to first predetermined data.

89. The network device of claim 86, wherein
when the data signal comprises packet data, the one half of the receive control signal is set to a second state, and the other half of the receive control signal is set to a first state.

90. The network device of claim 86, wherein
when a false carrier is asserted, the one half of the receive control signal is set to the second state, the other half of the receive control signal is set to a second state, and the received data signal is set to second predetermined data.

91. The network device of claim 86, wherein
when a symbol error is asserted, the one half of the received control signal is set to a second state, the second half of the receive control signal is set to the second state, and the receive data signal is set to first predetermined data.

92. The network device of claim 86, wherein
when a carrier extension is asserted, the one half of the receive control signal is set to a first state, the other half of the receive control signal is set to a second state, and the received data signal is set to one of third and fourth predetermined data.

93. The network device of claim 85, wherein when the means for encoding encodes the receive control signal which is not asserted on neither one half of the cycle of the clock signal nor on the other half of the cycle of the clock signal, then the means for encoding performs inband signaling.

94. An interface signaling protocol, comprising:
a transmit clock signal;
a transmit control signal comprising in one half of a cycle of the transmit clock signal a transmit enable signal and comprising in the other half of the cycle of the clock signal a transmit error signal; and
a transmit data signal.

95. The interface signaling protocol of claim 94, wherein when the transmit enable signal is asserted, the data signal comprises one of packet data and symbol error data.

96. The interface signaling protocol of claim 95, wherein
when neither the transmit enable signal nor the transmit error signal are asserted in a cycle of the clock signal, the data signal comprises idle data;
when the transmit enable signal is asserted and the transmit error signal is not asserted in a cycle of the clock signal, the data signal comprises packet data; and
when both the transmit enable signal and the transmit error signal are asserted in a cycle of the clock signal, the data signal comprises symbol error data.

97. The interface signaling protocol of claim 96, wherein
when the transmit enable signal is not asserted and the transmit error signal is asserted in a cycle of the clock signal, the data signal comprises one of carrier extension data and carrier extension data with error.

98. The interface signaling protocol of claim 94, wherein the clock signal has a frequency of either 2.5, 25 or 125 MHz.

99. An interface signaling protocol, comprising:
a clock signal;
a receive control signal comprising in one half of a cycle of the clock signal a receive data valid signal or a carrier sense signal and in the other half of the cycle of the clock signal a receive error signal; and
a receive data signal.

100. The interface signaling protocol of claim 99, wherein the receive data signal comprises a preamble.

101. The interface signaling protocol of claim 100, wherein
when a carrier sense signal is in a second state, the one half of the receive control signal Is set to the second state, and the other half of the receive control signal is set to a first state.

102. The interface signaling protocol of claim 100, wherein
when a subsequent data signal containing packet data is to be transmitted, the one half of the receive control signal is set to a second state, the other half of the receive control signal is set to a first state, and a current data signal is set to first predetermined data.

103. The interface signaling protocol of claim 100, wherein
when the data signal comprises packet data, the one half of the receive control signal is set to a second state, and the other half of the receive control signal is set to a first state.

104. The interface signaling protocol of claim 100, wherein
when a false carrier is asserted, the one half of the receive control signal is set to the second state, the other half of the receive control signal is set to a second state, and the received data signal is set to second predetermined data.

105. The interface signaling protocol of claim 100, wherein
when a symbol error is asserted, the one half of the received control signal is set to a second state, the second half of the receive control signal is set to the second state, and the receive data signal is set to first predetermined data.

106. The interface signaling protocol of claim 100, wherein
when a carrier extension is asserted, the one half of the receive control signal is set to a first state, the other half of the receive control signal is set to a second state, and the received data signal is set to one of third and fourth predetermined data.

107. A network device, comprising:
a clock transmitter to transmit a first clock signal;
an encoder to form a transmit control signal comprising in one half of a cycle of the first clock signal a transmit enable signal and comprising in the other half of the cycle of the first clock signal a transmit error signal;
a control signal transmitter to transmit the transmit control signal encoded by the encoder;
a data signal transmitter to transmit a first data signal;
a clock receiver to receive a second clock signal;
a control signal receiver to receive a receive control signal;
a decoder to decode the receive control signal comprising on one half of a cycle of the second clock signal a receive data valid signal or a carrier sense signal and on the other half of the cycle of the second clock signal a receive error signal; and
a data signal receiver to receive a second data signal.

108. A network device, comprising:
a clock receiver to receive a first clock signal;
a control signal receiver to receive a transmit control signal;
a decoder to decode the transmit control signal comprising in a half of a cycle of the first clock signal a transmit enable signal and in the other half of the cycle of the first clock signal a transmit error signal;
a data signal receiver to receive a first data signal;
a clock transmitter to transmit a second clock signal;
an encoder to encode a receive control signal comprising on one half of a cycle of the second clock signal a receive data valid signal or a carrier sense signal and on the other half of the cycle of the second clock signal a receive error signal;
a control signal transmitter to transmit the receive control signal; and
a data signal transmitter to transmit a second data signal.

109. A method of encoding signals for a network device, comprising the steps of:
receiving a clock signal;
forming a transmit control signal comprising in one half of a cycle of the clock signal a transmit enable signal and comprising in the other half of the cycle of the clock signal a transmit error signal;
transmitting the transmit control signal; and
transmitting a data signal.

110. The method of claim 109, wherein when the transmit enable signal is asserted, the data signal comprises one of packet data and symbol error data.

111. The method of claim 110, wherein
when neither the transmit enable signal nor the transmit error signal are asserted in a cycle of the clock signal, the data signal comprises idle data;
when the transmit enable signal is asserted and the transmit error signal is not asserted in a cycle of the clock signal, the data signal comprises packet data; and
when both the transmit enable signal and the transmit error signal are asserted in a cycle of the clock signal, the data signal comprises symbol error data.

112. The method of claim 111, wherein
when the transmit enable signal is not asserted and the transmit error signal is asserted in a cycle of the clock signal, the data signal comprises one of carrier extension data and carrier extension data with error.

113. The method of claim 109, wherein the clock signal has a frequency of either 2.5 MHz, 25 or 125 MHz.

114. The method of claim 109, further comprising the step of inband signaling when neither the transmit enable signal nor the transmit error signal are asserted in a cycle of the clock signal.

115. A method of decoding signals for a network device, comprising the steps of:

transmitting a clock signal;

receiving a transmit control signal;

decoding the transmit control signal comprising in a half of a cycle of the clock signal a transmit enable signal and in the other half of the cycle of the clock signal a transmit error signal; and receiving a data signal.

116. The method of claim 115, wherein when the transmit enable is asserted, the data signal comprises one of packet data and symbol error data.

117. The method of claim 116, wherein when neither the transmit enable signal nor the transmit error signal are asserted in a cycle of the clock signal, the data signal comprises idle data;

when the transmit enable signal is asserted and the transmit error signal is not asserted in a cycle of the clock signal, the data signal comprises packet data; and when both the transmit enable signal and the transmit error signal are asserted in a cycle of the clock signal, the data signal comprises a symbol error data.

118. The method of claim 117, wherein when the transmit enable signal is not asserted and the transmit error signal is asserted in a cycle of the clock signal, the data signal comprises one of carrier extension data and carrier extension data with error.

119. The method of claim 117, wherein the clock signal has a frequency of either 2.5, 25 or 125 MHz.

120. The method of claim 115, further comprising the step of inband signaling when neither the transmit enable signal nor the transmit error signal are asserted in a cycle of the clock signal.

121. A network device, comprising:

a clock receiver to receive a clock signal;

an encoder to form a transmit control signal comprising in one half of a cycle of the clock signal a transmit enable signal and comprising in the other half of the cycle of the clock signal a transmit error signal;

a control signal transmitter to transmit the transmit control signal encoded by the encoder; and a data signal transmitter to transmit a data signal.

122. The network device of claim 121, wherein when the encoder forms the transmit control signal on which the transmit enable signal is asserted, the data signal transmitter transmits the data signal comprised of one of packet data and symbol error data.

123. The network device of claim 122, wherein when the encoder forms the transmit control signal on which neither the transmit enable signal nor the transmit error signal are asserted in a cycle of the clock signal, the data signal transmitter transmits the data signal comprised of idle data;

when the encoder forms the transmit control signal on which the transmit enable signal is asserted and the transmit error signal is not asserted in a cycle of the clock signal, the data signal transmitter transmits the data signal comprised of packet data; and when the encoder forms the transmit control signal on which both the transmit enable signal and the transmit error signal are asserted in a cycle of the clock signal, the data signal transmitter transmits the data signal comprised of symbol error data.

124. The network device of claim 123, wherein when the encoder forms the transmit control signal on which the transmit enable signal is not asserted and the transmit error signal is asserted in a cycle of the clock signal, the data signal transmitter transmits the data signal comprised of one of carrier extension data and carrier extension data with error.

125. The network device of claim 121, wherein the clock signal has a frequency of either 2.5, 25 or 125 MHz.

126. The network device of claim 121, wherein when the encoder forms the transmit control signal on which neither the transmit enable signal nor the transmit error signal are asserted in a cycle of the clock signal, then the encoder performs inband signaling.

127. A network device, comprising:

a clock transmitter to transmit a clock signal;

a control signal receiver to receive a transmit control signal;

a decoder to decode the transmit control signal comprising in a half of a cycle of the clock signal a transmit enable signal and in the other half of the cycle of the clock signal a transmit error signal; and a data signal receiver to receive a data signal.

128. The network device of claim 127, wherein when the decoder the decodes the transmit control signal on which the transmit enable signal is asserted, the data signal receiver receives the data signal comprised of one of packet data and symbol error data.

129. The network device of claim 128, wherein when the decoder decodes the transmit control signal on which neither the transmit enable signal nor the transmit error signal are asserted in a cycle of the clock signal, the data signal receiver receives the data signal comprised of idle data;

when decoder decodes the transmit control signal on which the transmit enable signal is asserted and the transmit error signal is not asserted in a cycle of the clock signal, the data signal receiver receives the data signal comprised of packet data; and when the decoder decodes the transmit control signal on which both the transmit enable signal and the transmit error signal are asserted in a cycle of the clock signal, the data signal receiver receives the data signal comprised of a symbol error data.

130. The network device of claim 129, wherein when the decoder decodes the transmit control signal on which the transmit enable signal is not asserted and the transmit error signal is asserted in a cycle of the clock signal, the data signal receiver receives the data signal comprised of one of carrier extension data and carrier extension data with error.

131. The network device of claim 127, wherein the clock signal has a frequency of either 2.5, 25 or 125 MHz.

132. The network device of claim 127, wherein when the decoder decodes the transmit control signal on which neither the transmit enable signal nor the transmit error signal are asserted in a cycle of the clock signal, then the decoder performs inband signaling.

133. The network device of claim 127, wherein when the decoder decodes the transmit control signal on which neither the transmit enable signal nor the transmit error signal are asserted in a cycle of the clock signal, then the decoder performs inband signaling.

134. A network device, comprising:
   means for receiving a clock signal;
   means for forming a transmit control signal comprising in one half of a cycle of the clock signal a transmit enable signal and comprising in the other half of the cycle of the clock signal a transmit error signal;
   means for transmitting the transmit control signal; and
   means for transmitting a data signal.

135. The network device of claim 134, wherein when the transmit enable signal is asserted, the data signal comprises one of packet data and symbol error data.

136. The network device of claim 135, wherein
   when neither the transmit enable signal nor the transmit error signal are asserted in a cycle of the clock signal, the data signal comprises idle data;
   when the transmit enable signal is asserted and the transmit error signal is not asserted in a cycle of the clock signal, the data signal comprises packet data; and
   when both the transmit enable signal and the transmit error signal are asserted in a cycle of the clock signal, the data signal comprises symbol error data.

137. The network device of claim 136, wherein
   when the transmit enable signal is not asserted and the transmit error signal is asserted in a cycle of the clock signal, the data signal comprises one of carrier extension data and carrier extension data with error.

138. The network device of claim 134, wherein the clock signal has a frequency of either 2.5, 25 or 125 MHz.

139. The network device of claim 134, wherein when the means for forming forms the transmit control signal on which neither the transmit enable signal nor the transmit error signal are asserted in a cycle of the clock signal, then the means for forming forms inband signaling.

140. A network device, comprising:
   means for transmitting a clock signal;
   means for receiving a transmit control signal;
   means for decoding the transmit control signal comprising in a half of a cycle of the clock signal a transmit enable signal and in the other half of the cycle of the clock signal a transmit error signal; and
   means for receiving a data signal.

141. The network device of claim 140, wherein when the transmit enable is asserted, the data signal comprises one of packet data and symbol error data.

142. The network device of claim 141, wherein
   when neither the transmit enable signal nor the transmit error signal are asserted in a cycle of the clock signal, the data signal comprises idle data;
   when the transmit enable signal is asserted and the transmit error signal is not asserted in a cycle of the clock signal, the data signal comprises packet data; and
   when both the transmit enable signal and the transmit error signal are asserted in a cycle of the clock signal, the data signal comprises a symbol error data.

143. The network device of claim 142, wherein
   when the transmit enable signal is not asserted and the transmit error signal is asserted in a cycle of the clock signal, the data signal comprises one of carrier extension data and carrier extension data with error.

144. The network device of claim 140, wherein the clock signal has a frequency of either 2.5, 25 or 125 MHz.

145. The network device of claim 140, wherein when the means for decoding decodes the transmit control signal on which neither the transmit enable signal nor the transmit error signal are asserted in a cycle of the clock signal, then the means for decoding performs inband signaling.

146. The network device of claim 140, wherein when the means for decoding decodes the transmit control signal on which neither the transmit enable signal nor the transmit error signal are asserted in a cycle of the clock signal, then the means for decoding performs inband signaling.

147. A network device, comprising:
   a clock receiver to receive a first clock signal;
   an encoder to form a transmit control signal comprising in one half of a cycle of the first clock signal a transmit enable signal and comprising in the other half of the cycle of the first clock signal a transmit error signal;
   a control signal transmitter to transmit the transmit control signal encoded by the encoder;
   a data signal transmitter to transmit a first data signal;
   a clock receiver to receive a second clock signal;
   a control signal receiver to receive a receive control signal;
   a decoder to decode the receive control signal comprising on one half of a cycle of the second clock signal a receive data valid signal or a carrier sense signal and on the other half of the cycle of the second clock signal a receive error signal; and
   a data signal receiver to receive a second data signal.

148. A network device, comprising:
   a clock transmitter to transmit a first clock signal;
   a control signal receiver to receive a transmit control signal;
   a decoder to decode the transmit control signal comprising in a half of a cycle of the first clock signal a transmit enable signal and in the other half of the cycle of the first clock signal a transmit error signal;
   a data signal receiver to receive a first data signal;
   a clock transmitter to transmit a second clock signal;
   an encoder to encode a receive control signal comprising on one half of a cycle of the second clock signal a receive data valid signal or a carrier sense signal and on the other half of the cycle of the second clock signal a receive error signal;
   a control signal transmitter to transmit the receive control signal; and
   a data signal transmitter to transmit a second data signal.

* * * * *